United States Patent [19]
Maddoux et al.

[11] Patent Number: 5,937,773
[45] Date of Patent: Aug. 17, 1999

[54] APPLICATOR FOR PARTICULATE MATERIAL

[75] Inventors: Don Maddoux, Oklahoma City, Okla.; Paul Goertz, Pratt, Kans.

[73] Assignee: Midstates Ag Services, Inc., Oklahoma City, Okla.

[21] Appl. No.: 08/938,526

[22] Filed: Sep. 26, 1997

[51] Int. Cl.⁶ .................................................. A01C 19/02
[52] U.S. Cl. .......................................... 111/173; 111/177
[58] Field of Search .................................. 111/173, 170, 111/177, 200, 63, 64, 65, 77, 925

[56] References Cited

U.S. PATENT DOCUMENTS

| | | | |
|---|---|---|---|
| 5,703 | 8/1848 | Gatling | 111/173 X |
| 1,073,826 | 9/1913 | Waite | 111/173 X |
| 1,181,930 | 5/1916 | Sherwin | 111/173 X |
| 1,556,850 | 10/1925 | Kühne | 111/63 X |
| 2,596,898 | 5/1952 | Hoppes | 111/173 X |
| 2,626,579 | 1/1953 | Shaw | 111/64 |
| 2,755,002 | 7/1956 | Gustafson | 111/77 X |
| 2,906,436 | 9/1959 | Oehler et al. | 111/173 X |
| 3,554,145 | 1/1971 | Hornung et al. | 111/77 |
| 3,558,015 | 1/1971 | Hardesty | 111/173 X |
| 3,851,604 | 12/1974 | Seifert, Jr. | 111/77 |
| 4,896,615 | 1/1990 | Hood, Jr. et al. | 111/925 X |

FOREIGN PATENT DOCUMENTS

| | | | |
|---|---|---|---|
| 263984 | 2/1965 | Australia | 111/173 |
| 1087463 | 10/1980 | Canada | 111/173 |
| 334358 | 9/1930 | United Kingdom | 111/63 |

OTHER PUBLICATIONS

Hestair Stanhay S870 Seed Drill, Hestair Farm Equipment Limited, Godington Way, Ashford, Kent, UK., Date Unknown.
Dempster Clipper LTC 250 brochure (1992).
Dempster Airship brochure (1990).
Prior public uses and sales of seed drills described in Information Disclosure Statement, Date Unknown.

*Primary Examiner*—Christopher J. Novosad
*Attorney, Agent, or Firm*—Gary Peterson

[57] ABSTRACT

An applicator for dropping particulate material, such as fertilizer, to ground level, is formed from one or more hoppers capable of receiving particulate material, mounted on a wheeled main frame. Particles received from dispensing outlets depending from the lowermost section of each hopper are discharged into a horizontal delivery tube, within which is installed an auger shaft which carries helical flighting. Rotation of the auger shaft, driven by a drive system, causes the flighting to move the received particles to a particle outlet at a predetermined particle delivery rate. A control system, operatively engaged with the drive system, permits the user to determine the rate of auger shaft rotation, as dictated by the user's particle delivery rate requirements. Once particles reach the particle outlet, they are discharged into a conduit, through which they fall to ground level. Conduits serving adjacent dispensing outlets may be paired in order to permit distribution of particles on opposite sides of a row of crops.

20 Claims, 4 Drawing Sheets

APPLICATOR FOR PARTICULATE MATERIAL

FIELD OF THE INVENTION

The present invention relates generally to applicators for particulate material, and more particularly to applicators for dropping particulate materials of agricultural utility, such as fertilizer, to ground level.

SUMMARY OF THE INVENTION

The present invention comprises an applicator for dropping particulate material to ground level. It is formed from at least one hopper capable of receiving particulate material. The lower section of each such hopper is characterized by at least one tapered dispensing chamber which terminates in a dispensing outlet. Provided for each such dispensing chamber is a particle delivery system, formed from a delivery tube having a particle inlet in communication with the dispensing outlet of the dispensing chamber, and a spaced particle outlet.

Each particle delivery system further comprises a rotatable auger shaft coaxially received within the delivery tube, with helical flighting supported on the auger shaft. This flighting is confined by the delivery tube with a minimum nonbinding clearance, and is capable, upon rotation of the auger shaft, of moving a predetermined quantity of particles from the particle inlet to the particle outlet. A drop accessway, at or adjacent to the particle outlet, permits particles which have been delivered to the particle outlet to drop to ground level. A drive system drives rotation of the auger shaft, and a control system, operatively engaged with the drive system, controls the rate of rotation of the auger shaft in response to a particle delivery rate requirement selected by a user.

DETAILED DESCRIPTION OF THE PREFERRED EMBODIMENTS

Figure 1:
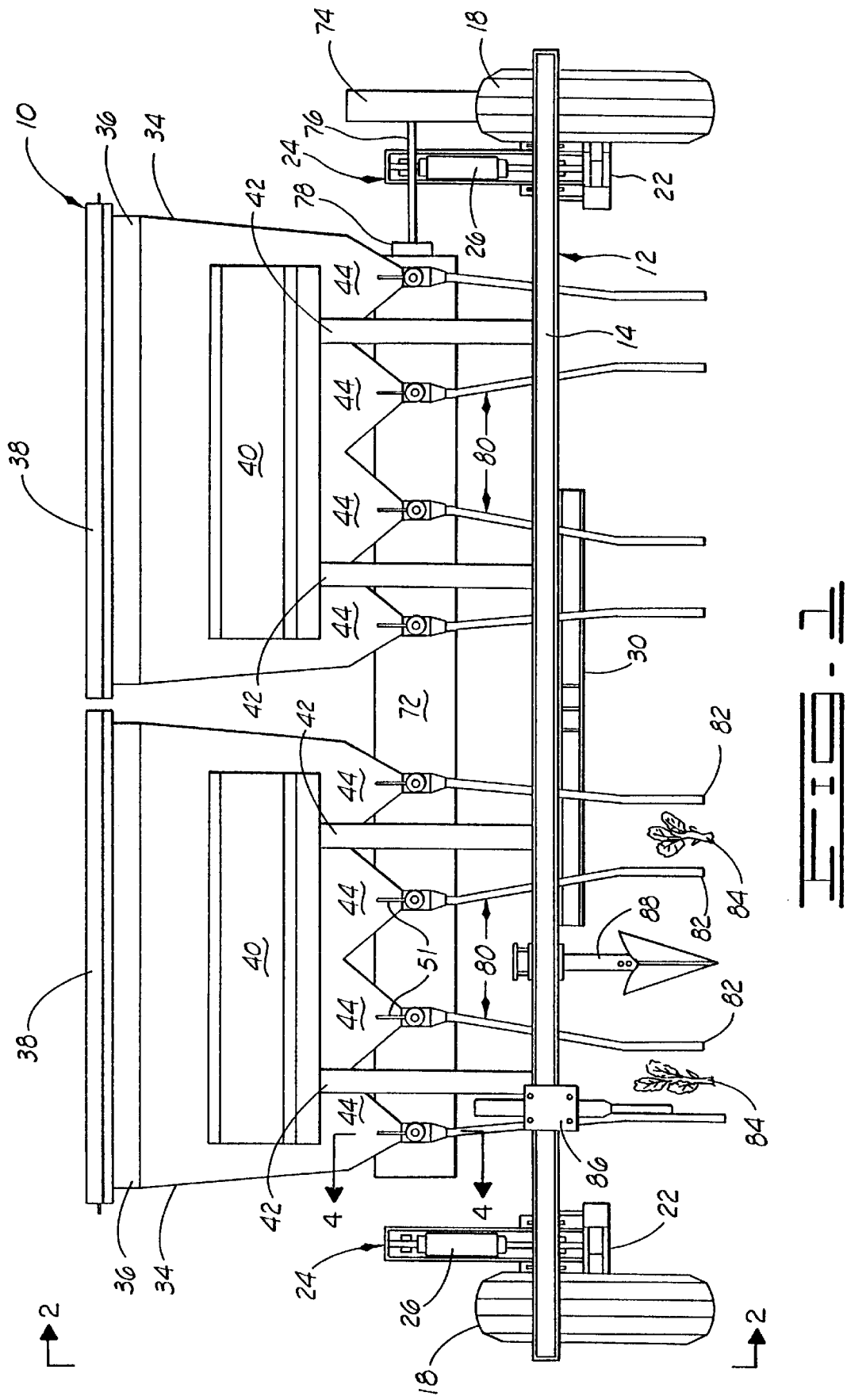
FIG. 1 is a front elevational view of the applicator of the present invention. Only a single knife, and only a single furrow opener have been shown in this view, in order to permit better display of the other components of the invention.

With reference to FIG. 1, the applicator apparatus of the present invention, generally designated by reference numeral 10, is formed on a rigid main frame 12. The main frame 12 preferably comprises an open, rectangular framework formed from a strong and durable material such as structural steel. In a preferred embodiment, the main frame 12 comprises a forward frame member 14, and a spaced and parallel rear frame member (not shown). The forward and rear members are interconnected by a pair of parallel lateral frame members 16, one of which is shown in FIG. 2.

Figure 2:
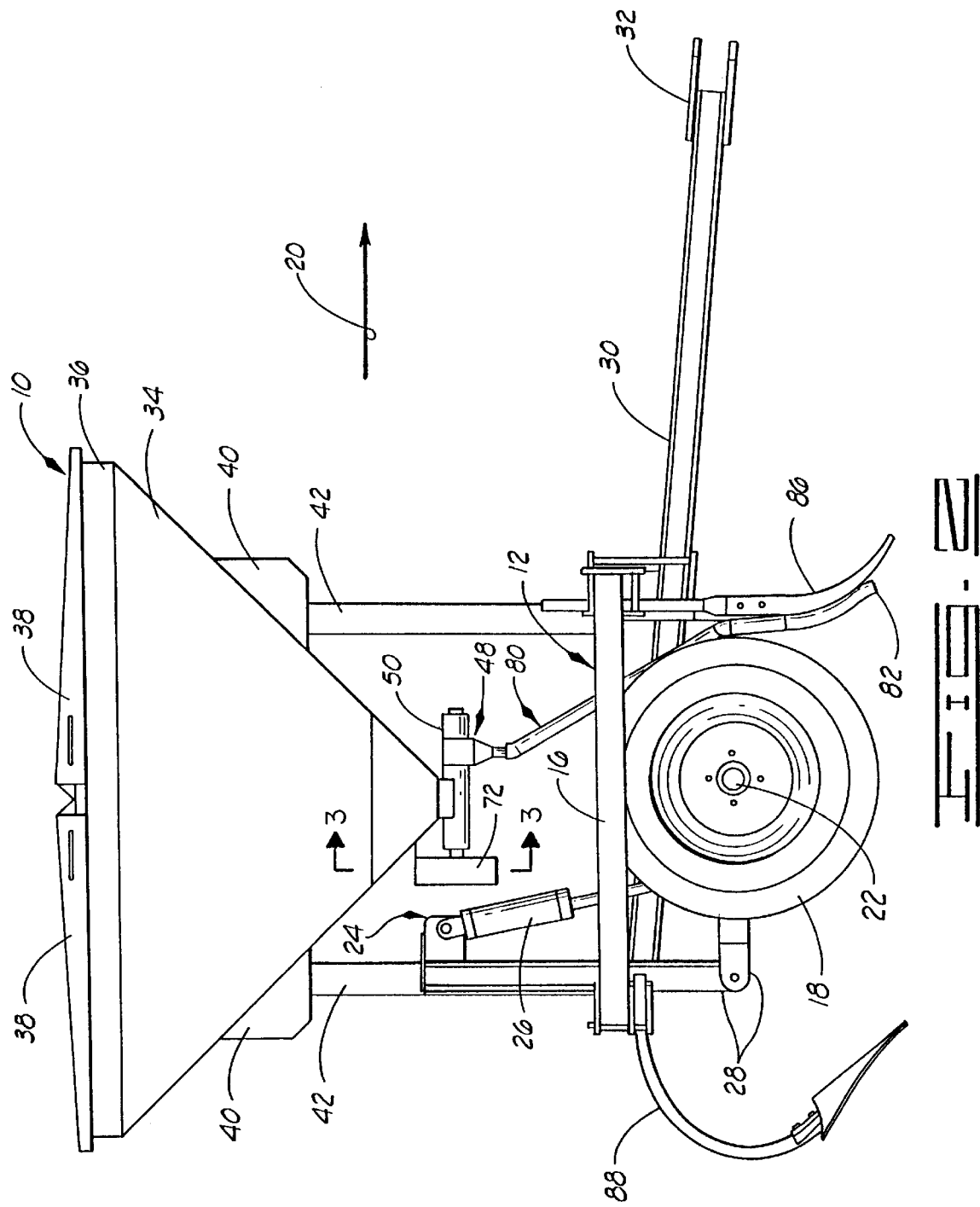
FIG. 2 is a side elevational view of the applicator shown in FIG. 1, taken along line 2—2.

With continued reference to FIGS. 1 and 2, the applicator apparatus 10 further comprises at least two ground-contacting wheels 18, upon which the main frame 12 is supported for forward movement in the direction shown by the arrow 20. In a preferred embodiment, a pair of wheels 18 are provided, with the wheels 18 coaxially disposed along an axis perpendicular to the direction of travel 20. Each wheel 18 preferably comprises a rubber tire rotatably mounted on an axle 22.

The ground-contacting wheels 18 are preferably connected to the main frame 12 by a lifting system 24. The lifting system preferably comprises a hydraulic cylinder 26, positioned adjacent to each wheel 18, which is pivotally secured to a mechanical linkage 28 which is in turn secured to the main frame 12. The hydraulic cylinder 16 and associated mechanical linkage 28 function to interconnect the axle 22 and the main frame 12, such that extension of the hydraulic cylinder 26 elevates the main frame 12 relative to the wheels 18 (as may be required for road transport of the applicator apparatus 10), while retraction of the hydraulic cylinder 26 lowers the main frame 12 relative to the wheels 18 (as required during application operations).

Pivotally supported to the underside of the main frame 12, preferably at its rear frame member, is a V-shaped tow bar 30, having a hitch 32 which may be secured behind a towing vehicle, such as a tractor.

Figure 4:
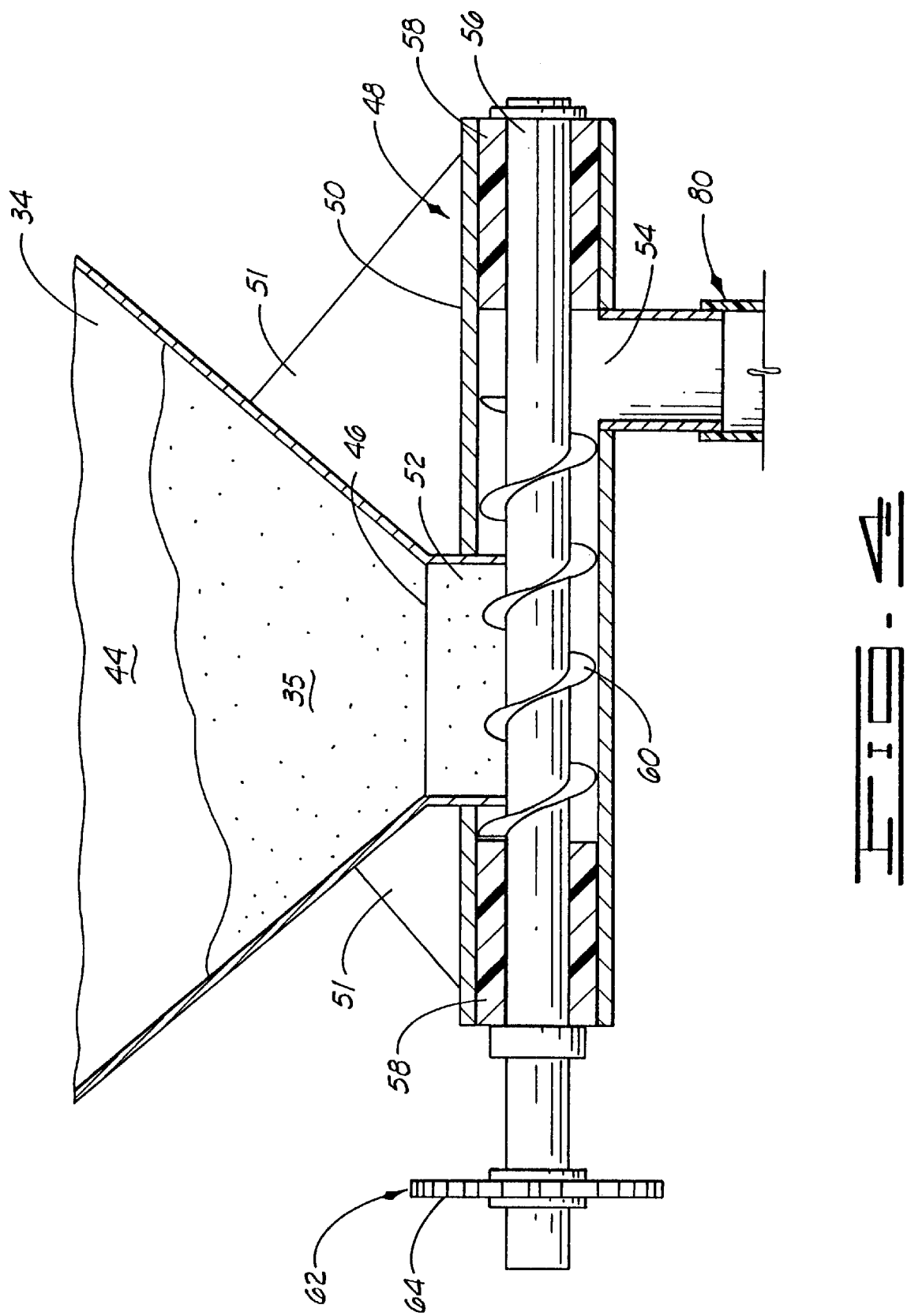
FIG. 4 is an enlarged cross-sectional view of the particle delivery system of the applicator shown in FIG. 1, taken along line 4—4. The drive chain has been omitted from this view, in order to permit better display of other components. Likewise, the quantity of fertilizer situated within the hopper and particle delivery system has been partially cut away for display purposes.

As best shown in FIGS. 1, 2 and 4, the applicator apparatus 10 of the present invention further comprises at least one hopper 34 capable of receiving particulate material, such as fertilizer, seed or other materials of agricultural utility (such as the quantity of fertilizer 35 shown in FIG. 4). As best shown in FIG. 2, preferably at least two, and most preferably two or three, such hoppers 34 are supported on the main frame 12, disposed in side-by-side relationship along a line perpendicular to the direction of travel 20 of applicator apparatus 10.

Each hopper 34 is characterized by a unitary upper section 36, through which particulate material may be received. The upward-opening mouth defined by the upper section 36 may be selectively closed by doors 38, supported on the hopper 34, so as to protect the contents of the hopper 34. However, the doors 38 are preferably removable, in order to permit nesting of hoppers 34 for purposes of storage and transport.

As best shown in FIG. 2, each hopper 34 is preferably characterized by a downwardly tapering configuration characterized by a generally triangular cross-section. Each hopper 34 is supported between a pair of transversely-extending brace elements 40, respectively positioned above the forward and rear frame members of the main frame 12. The transverse brace elements 40 are in turn supported to a plurality of upright members 42 supported by the forward and rear members of the main frame 12.

Figure 3:
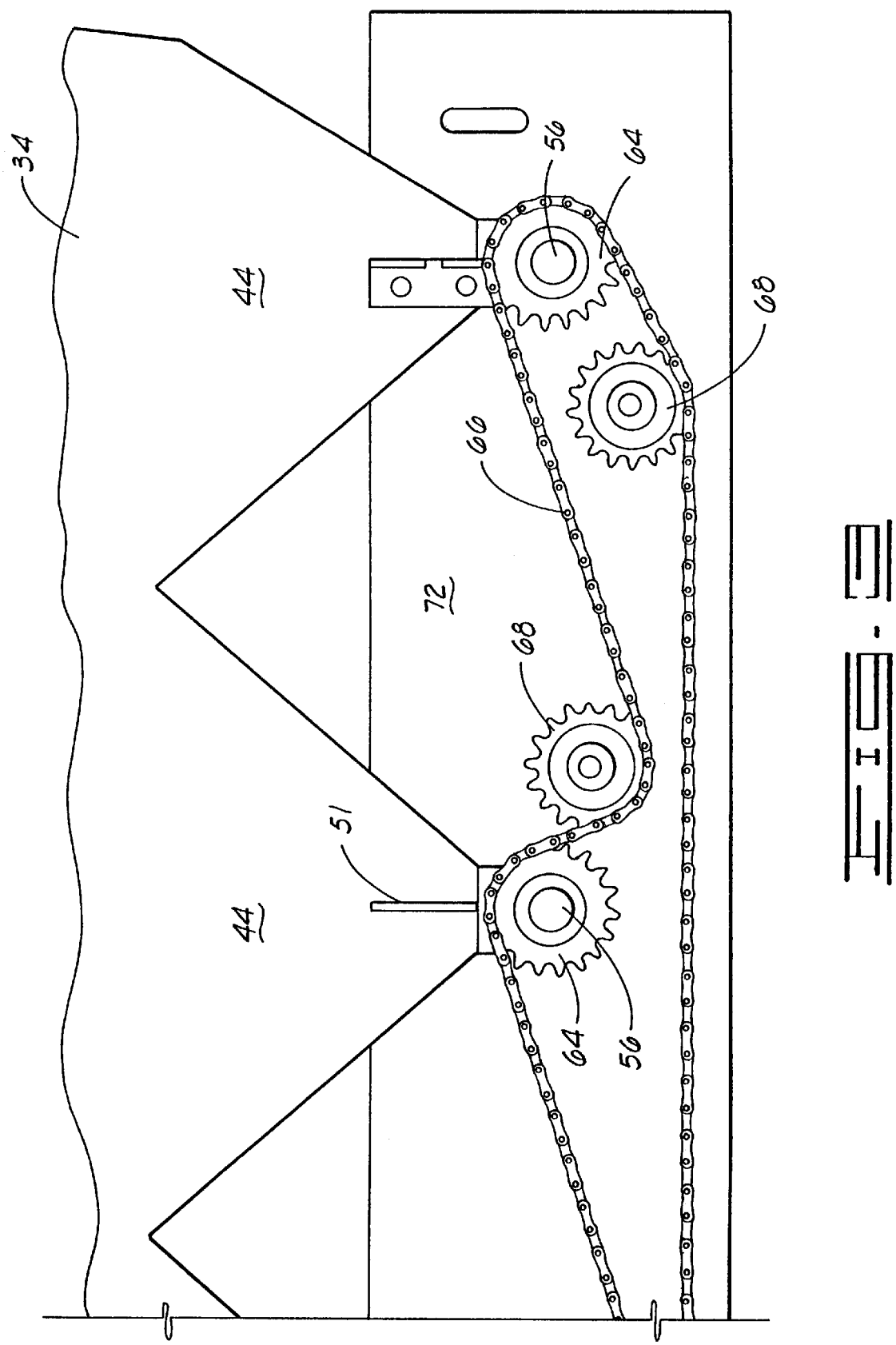
FIG. 3 is an enlarged, partially cut away view of the drive system of the applicator shown in FIG. 2, taken along line 3—3.

With reference to FIGS. 1, 3 and 4, the lowermost portion of each hopper 34 is characterized by at least one, and more preferably at least two tapered, downwardly depending dispensing chambers 44, each of which terminates in a dispensing outlet 46. In the most preferred embodiment shown in the Figures, each hopper 34 is characterized by four dispensing chambers 44. The dispensing chambers 44 of each hopper 34 are disposed in spaced, collinear and side-by-side relationship, along a line perpendicular to the line of travel 20. When the applicator comprises a plurality of hoppers 34, the dispensing chambers of one hopper are preferably disposed in collinear relationship to the dispensing chambers of each other hopper as well.

With particular reference to FIGS. 2 and 4, the applicator apparatus 10 of the present invention further comprises at least one, and preferably a plurality of particle delivery systems 48, which function to deliver particulate material received within each dispensing chamber 44 to ground level. Preferably, each single particle delivery system 48 serves only a single dispensing chamber 44, and vice versa, so that the dispensing chambers 44 and particle delivery systems 48 are equal in number and in one-to-one correspondence.

Comprising each particle delivery system 48 is a delivery tube 50, preferably cylindrical in shape and formed from a rigid and durable material such as tubular steel. The axis of the delivery tube 50 is preferably oriented horizontally, along a line parallel to the direction of travel 20, and is supported in dependent relationship to the hopper 34 by brackets 51, which are secured by welding to the delivery tube 50 and hopper 34.

As best shown in FIG. 4, the delivery tube 50 is characterized by a particle inlet 52 which communicates with the dispensing outlet 46 of the dispensing chamber 44, and a spaced particle outlet 54. Preferably, the particle inlet 52 comprises an opening formed in the lateral surface of the delivery tube 50. Similarly, the particle outlet 54 preferably comprises an opening formed in the lateral surface of the delivery tube 50.

Each particle delivery system 48 preferably further comprises a rotatable auger shaft 56, which is coaxially received within the delivery tube 50, and is supported on bearings 58 for rotation within the delivery tube 50. Helical flighting 60 is installed on the lateral surface of auger shaft 56; this flighting 60 is sized so as to be confined by the inner walls of the delivery tube 50 with a minimum nonbinding clearance.

The flighting 60 has constant pitch throughout its length, and is therefore capable, for any given size of particle and at any given rate of rotation of the auger shaft 56, of moving a substantially predictable quantity of particles from the particle inlet 52 to the particle outlet 54 of the delivery tube 50. Thus, by control of the rate of rotation of the auger shaft 56, delivery of particles to the particle outlet 54 can be effected at any preselected rate, so that a predetermined quantity of particles may be moved from the particle inlet 52 to the particle outlet 54. In this regard, the particle inlet 52 and particle outlet 54 of the delivery tube 50 are preferably spaced by a distance exceeding the pitch of the flighting 60, so that particles may not be discharged from the delivery tube 50 more swiftly than the rate at which particles are moved forward by rotation of the flighting 60. This feature stabilizes the particle discharge rate, and promotes more accurate control of particle delivery.

As best shown in FIGS. 3 and 4, the particle delivery system 48 of the applicator apparatus 10 of the present invention further comprises a drive system 62 for driving rotation of the auger shaft 56. The drive system 62 comprises a drive sprocket 64 installed on each auger shaft 56, preferably adjacent to the end of the shaft opposite the particle outlet 54. The drive sprocket 64 is in turn engaged with an endless primary drive chain 66, which functions to transmit rotational power to the auger shaft 56. Preferably, a single primary drive chain 66 engages all of the auger shafts 56 serving each hopper 34 of the applicator apparatus 10, so that all of these auger shafts 56 are driven at the same rotational rate.

With reference to FIG. 3, the lower length of the primary drive chain 66 is preferably further engaged with idler sprockets 68 positioned on one side of each non-terminal drive sprocket. The upper length of the primary drive chain 66 is preferably further engaged with idler sprockets 68 positioned on the inboard sides of the two terminal drive sprockets. These components of the drive system 62 are installed within a lightweight cowling 72 (shown in FIGS. 1 and 2), which is in turn secured by brackets to the lower portion of the hoppers 34.

When the applicator apparatus 10 comprises multiple hoppers 34 (as in the preferred embodiment shown in the Figures), then a separate primary drive chain 66 interconnects the auger shafts 56 serving each hopper 34 of the applicator apparatus 10. A gear (not shown) mounted on the terminal auger shaft 56 of one hopper 34 is drivingly interconnected to a gear (not shown) mounted on the adjacent terminal auger shaft 56 of the adjacent hopper 34 by a secondary drive chain (not shown). This feature assures that the auger shafts 56 of adjacent hoppers 34 are driven at the same rotational rate, thereby causing the particles from each hopper 34 to be delivered from their respective particle delivery systems 48 at the same delivery rate.

As best shown in FIG. 1, the drive system 62 further comprises a power takeoff wheel 74, which may be selectively moved into rolling engagement with one of the ground wheels 18 when delivery of particles (via rotation of the auger shafts 56) is desired. In this engaged configuration, rotation of the ground wheel 18 drives rotation of the power takeoff wheel 74, which in turn drives rotation of a power shaft 76 coaxially installed on the power takeoff wheel 74.

The power shaft 76 is in turn operatively engaged with a conventional gearbox 78, which functions to transmit the rotational power of the power shaft 76, by means of a system of shafts and gears (not shown), to a gear (not shown) mounted on the auger shaft 56 of a selected one of the primary drive chains 66, preferably the primary drive chain 66 nearest the gearbox 78. This selected auger shaft 56 serves as a master drive shaft which drives its own primary drive chain 66, as well as the other primary drive chains 66 by means of the above-described secondary drive chain systems.

Pre-measurement of the rate of particle delivery for a given rate of rotation of the auger shaft 56 will permit advance determination of what rotational speed of the drive chain 66 is required is to effect such delivery rate. The gearbox 78 preferably permits selection of any of a range of gear ratios, with each available gear ratio capable of effecting a drive chain speed corresponding to a rate of particle delivery available for selection by a user. The gearbox 78, in cooperation with the other components just described, thus functions as a control system for controlling the rate of rotation of the auger shaft in response to a particle delivery rate requirement selected by a user.

With reference to FIGS. 1, 2 and 4, each particle delivery system 48 further comprises a drop accessway 80, through which particles delivered to the particle outlet 54 may drop to ground level. The drop accessway 80, which may comprise a chute but more preferably comprises a flexible conduit formed from polyethylene or a similar material, is positioned at or immediately adjacent to the particle outlet 54. In the preferred embodiment shown in the Figures, the particle outlet 54 is positioned on the underside of the delivery tube 50, thereby permitting a gravity drop of delivered particles through the particle outlet 54 and into the drop accessway 80. The drop accessway 80 extends, from a position at or immediately adjacent to the particle outlet 54, to a ground outlet 82 adjacent to ground level, where delivered particles are discharged.

As discussed above, the applicator apparatus 10 of the present invention preferably comprises at least two and more preferably as many as eight dispensing chambers 44, each served by a corresponding particle delivery system 48. Because these particle delivery systems 48 preferably are situated in side-by-side relationship, the drop accessways 80 of adjacent particle delivery systems 48 are disposed in collinear, side-by-side relationship as well, as shown in FIG. 1. Preferably, the drop accessway 80 serving one dispensing chamber 44 is positionable in relation to the drop accessway 80 serving an adjacent dispensing chamber 44, so that the paired drop accessways may discharge particles at ground outlets on opposite sides of, but in close proximity to, a row of crops 84. This feature of the applicator apparatus 10 permits precision delivery of metered amounts of agricultural particles, such as fertilizer, to row crops such as corn, soybeans, cotton and potatoes.

As best shown in FIGS. 1 and 2, each drop accessway 80 is anchored adjacent to its ground outlet 82 to the trailing section of a knife 86, which is installed on the forward frame member 14 and positioned to cuttingly engage the ground. Each knife 86 functions to cut an opening in the ground, into which delivered particles are dropped through the trailing drop accessway 80. The knives further function to maintain the ground outlets 82 of the drop accessways 80 in fixed positions (such as on opposite sides of a crop row).

Each knife 86 is preferably associated with a corresponding furrow opener 88, which is installed on the rear frame member of the main frame 12, in trailing relationship to the knife 86 and drop accessway 80. Although only a single furrow opener 88 has been shown in FIG. 1 for display purposes, it should be understood that a plurality of furrow openers are installed on the rear frame member 14, in a number preferably equalling one plus the number of paired drop accessways 80. Thus, in the apparatus shown in FIG. 1, five (one plus four) furrow openers would be provided. Each furrow opener 88, which travels along a line offset from, but parallel to, the paired knives 86 and drop accessways 80, functions to engage the ground and rebuild any furrow structure which was disturbed by operation of the knives 86. The furrow openers 88 thereby restore the ground to substantially the same state existing prior to its disturbance by operation of the applicator apparatus 10.

In operation, the hoppers 34 are filled with quantities of particles (such as the fertilizer 35). If the applicator apparatus 10 is to be used to distribute particles on opposite sides of rows of crops 84, adjacent pairs of drop accessways 80 are positioned so that the ground outlets 82 discharge on opposite sides of the rows to be treated. Based on the user's particle delivery rate requirement, the user selects an appropriate drive chain speed at the gearbox 78. The applicator apparatus 10 is then towed in direction of travel 20 by a towing vehicle. Rotation of the drive wheel 18 drives rotation of the power takeoff wheel 74, which in turn drives the power shaft 76. Rotation of the power shaft, via gearbox 78 and its associated shaft and gear system, in turn drives the drive chain 66.

Particles in the hoppers 34 fall by gravity through the dispensing outlets 34 and into the horizontal delivery tubes 50. Rotation of the auger shafts 56, driven by the drive chain 66, causes the flighting 60 within each delivery tube 50 to move the particles from the particle inlet 52 to the particle outlet 54 of the delivery tube 50, at a rate which satisfies the user's particle delivery rate requirements. Once particles reach the particle outlet 54, they discharge into the drop accessway 80, through which they fall by gravity to ground level. The applicator apparatus 10 is thus well-adapted for spreading fertilizer on opposite sides of a row of growing crops, as well as for other agricultural applications.

Changes may be made in the construction, operation and arrangement of the various parts, elements, steps and procedures described herein without departing from the spirit and scope of the invention as defined in the following claims.

What is claimed is:

1. An applicator for dropping particular material to ground level, comprising:

at least one hopper capable of receiving particulate material, a lower section of each such hopper having at least one tapered dispensing chamber which terminates in a dispensing outlet; and a particle delivery system for each such dispensing chamber, each particle delivery system comprising:

a delivery tube having a particle inlet in communication with the dispensing outlet of the dispensing chamber, and a spaced particle outlet;

a rotatable auger shaft coaxially received within the delivery tube;

helical flighting supported on the auger shaft, which flighting is confined by the delivery tube with a minimum nonbinding clearance, and which is capable, upon rotation of the auger shaft, of moving a predetermined quantity of particles from the particle inlet to the particle outlet;

a drop accessway, at or adjacent to the particle outlet, through which particles delivered to the particle outlet may drop to ground level;

a drive system for driving rotation of the auger shaft; and a control system, operatively engaged with the drive system, for controlling the rate of rotation of the auger shaft in response to a particle delivery rate requirement selected by a user.

2. The applicator of claim 1 in which the particle inlet comprises an opening formed in a lateral surface of the delivery tube.

3. The applicator of claim 1 in which the particle outlet comprises an opening formed in a lateral surface of the delivery tube.

4. The applicator of claim 3 in which the particle inlet comprises an opening formed in a lateral surface of the delivery tube.

5. The applicator of claim 1 in which the particle inlet and particle outlet of the delivery tube are spaced by a distance exceeding the pitch of the flighting.

6. The applicator of claim 1 comprising at least two dispensing chambers, each served by a corresponding particle delivery system, with such dispensing chambers disposed in collinear relationship.

7. The applicator of claim 6 comprising at least two hoppers, each hopper having at least two dispensing chambers, with such dispensing chambers disposed in collinear relationship.

8. The applicator of claim 7 comprising two hoppers, each such hopper having four dispensing chambers.

9. The applicator of claim 6 in which the drop accessway serving one dispensing chamber is positionable in relation to the drop accessway serving an adjacent dispensing chamber, so that the paired drop accessways may discharge particles on opposite sides of a row of crops.

10. The applicator of claim 1 in which the auger shaft is characterized by two opposed ends and is positioned within the delivery tube such that the particle outlet underlies a point intermediate the opposed ends, and further comprising:

a bearing assembly which rotatably supports the auger shaft at each of its opposed ends.

11. A fertilizer applicator system comprising:
- at least one hopper, a lower section of each such hopper having at least one tapered dispensing chamber which terminates in a dispensing outlet;
- a quantity of fertilizer received within each such hopper; and
- a fertilizer delivery system for each such dispensing chamber, each fertilizer delivery system comprising:
  - a delivery tube having a particle inlet in communication with the dispensing outlet of the dispensing chamber, and a spaced particle outlet;
  - a rotatable auger shaft coaxially received within the delivery tube;
  - helical flighting supported on the auger shaft, which flighting is confined by the delivery tube with a minimum nonbinding clearance, and which is capable, upon rotation of the auger shaft, of moving a predetermined quantity of fertilizer from the particle inlet to the particle outlet;
  - a drop accessway, at or adjacent to the particle outlet, through which fertilizer delivered to the particle outlet may drop to ground level;
  - a drive system for driving rotation of the auger shaft; and
  - a control system, operatively engaged with the drive system, for controlling the rate of rotation of the auger shaft in response to a fertilizer delivery rate requirement selected by a user.

12. The system of claim 11 in which the particle inlet comprises an opening formed in a lateral surface of the delivery tube.

13. The system of claim 11 in which the particle outlet comprises an opening formed in a lateral surface of the delivery tube.

14. The system of claim 13 in which the particle inlet comprises an opening formed in a lateral surface of the delivery tube.

15. The system of claim 11 in which the particle inlet and particle outlet of the delivery tube are spaced by a distance exceeding the pitch of the flighting.

16. The system of claim 11 comprising at least two dispensing chambers, each served by a corresponding fertilizer delivery system, with such dispensing chambers disposed in collinear relationship.

17. The applicator of claim 16 comprising at least two hoppers, each hopper having at least two dispensing chambers, with such dispensing chambers disposed in collinear relationship.

18. The applicator of claim 17 comprising two hoppers, each such hopper having four dispensing chambers.

19. The applicator of claim 16 in which the drop accessway serving one dispensing chamber is positionable in relation to the drop accessway serving an adjacent dispensing chamber, so that the paired drop accessways may discharge fertilizer on opposite sides of a row of crops.

20. The applicator of claim 11 in which the auger shaft is characterized by two opposed ends and is positioned within the delivery tube such that the particle outlet underlies a point intermediate the opposed ends, and further comprising:
- a bearing assembly which rotatably supports the auger shaft at each of its opposed ends.

* * * * *